United States Patent [19]

Gawell et al.

[11] Patent Number: 5,325,025
[45] Date of Patent: Jun. 28, 1994

[54] MULTIPLE FREQUENCY HORIZONTAL SCAN COMPENSATION SYSTEM

[75] Inventors: George R. Gawell, Mt. Prospect; Philip J. Nowaczyk, Chicago, both of Ill.

[73] Assignee: Zenith Electronics Corporation, Glenview, Ill.

[21] Appl. No.: 34,920

[22] Filed: Mar. 19, 1993

[51] Int. Cl.[5] .................. H01J 29/70; H01J 29/76
[52] U.S. Cl. ....................... 315/408; 315/370
[58] Field of Search ................ 315/370, 408, 411, 371

[56] References Cited

U.S. PATENT DOCUMENTS

| | | | |
|---|---|---|---|
| 4,536,684 | 8/1985 | Babcock | 315/411 |
| 4,645,989 | 2/1987 | Barnes | 315/411 |
| 4,761,586 | 8/1988 | Wharton | 315/408 |

*Primary Examiner*—Theodore M. Blum

[57] ABSTRACT

A multiple frequency horizontal scan system includes a scan frequency compensation system which detects horizontal scan frequency changes by frequency detecting the horizontal sync pulses. A frequency responsive switching system couples the appropriate reactive components to the horizontal defection yoke and horizontal output transformer in response to sync pulse frequency. The system further supplies alternative voltages for the scan system operating supply in response to horizontal sync pulse frequency. In addition, the system provides a convenient source of frequency dependent switching signal which may be utilized to operate additional auxiliary elements in response to changes of horizontal scan system frequency.

7 Claims, 2 Drawing Sheets

MULTIPLE FREQUENCY HORIZONTAL SCAN COMPENSATION SYSTEM

FIELD OF THE INVENTION

This invention relates generally to cathode ray tube displays and particularly to those used for computer monitors.

BACKGROUND OF THE INVENTION

In a typical cathode ray tube display of the type commonly used for computer monitors and the like, an electron gun assembly produces one or more electron beams which are directed toward a phosphor coated imaging screen. In monochrome monitors, a single electron beam is produced while in most color monitors a plurality of electron beams are produced. The electron beam is focused to the desired spot size at the CRT phosphor screen and accelerated by a high voltage accelerating potential within the cathode ray tube to cause the electrons within the electron beam to impact the phosphor areas of the phosphor screen with sufficient energy to produce the desired light output. In addition, the electron beam or beams are deflected both horizontally and vertically with respect to the phosphor screen to produce a swept raster in which the screen is scanned in one direction at a higher scan rate and progressively scanned in the orthogonal direction at a somewhat slower rate. In most display systems, the horizontal scan occurs at a much higher scan rate than the vertical scan.

The desired image is formed upon the phosphor screen by intensity modulating the electron beam or beams in accordance with an image signal. To properly display the image, the scanning process must be synchronized to the image signal. This function is generally accomplished by including a plurality of vertical and horizontal scan synchronizing signals within the image signal in what is often referred to as the composite video and sync signal.

In many situations in which computer monitor displays are utilized, it is desirable to operate the display scanning systems at a plurality of scan frequencies. Because the systems which produce the cathode ray tube scanning and high voltage electron beam accelerating potential are highly interactive and frequently utilize frequency tuned circuit components, changes of scan frequency produce undesired and often damaging responses within the interrelated system components. This is particularly true of the horizontal or higher scan rate deflection portion of the display scanning system. To accommodate the interactive changes within the display system and provide appropriate compensation to avoid performance loss or component damage, practitioners in the art have generally attempted to provide switching systems which introduce compensating changes of component values into the scanning and electron beam accelerating potential generation system when scan frequency is changed.

For the most part, such systems have generally involved the use of a plurality of switches together with redundant components. In other systems, large segments of the display scanning system are provided in a virtual complete redundancy to accommodate frequency changes. Such systems have been found to greatly increase the monitor costs and often introduce additional sources of unreliability to the overall monitor performance. There remains, therefore, a need in the art for an improved scan compensation system for use within multiple scan frequency monitors.

Accordingly, it is a general object of the present invention to provide an improved multiple frequency scan system for display monitors or the like. It is more particular object of the present invention to provide an improved multiple frequency scan system which automatically compensates for changes of scan frequencies to maintain consistent monitor performance.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
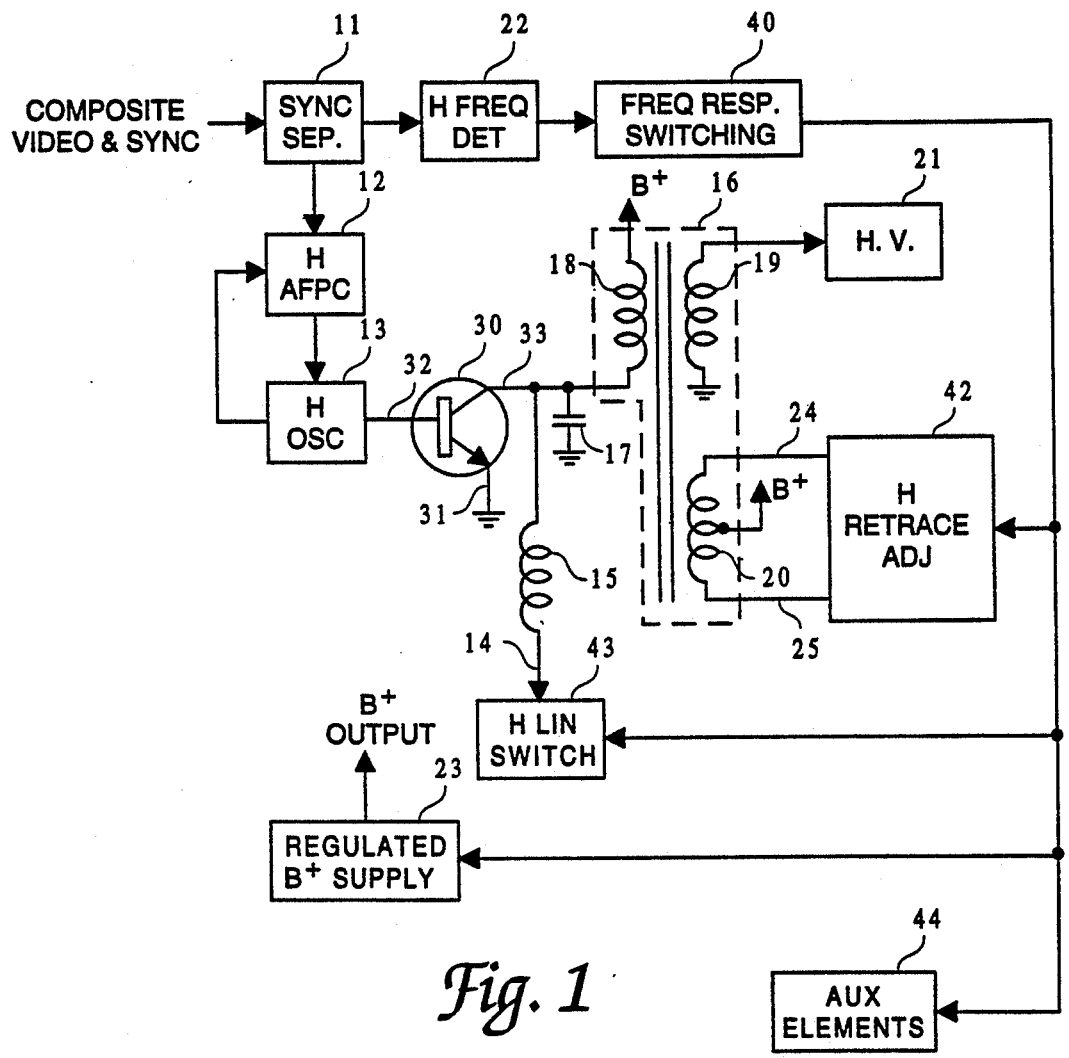
FIG. 1 sets forth a partial schematic, partial block diagram of a horizontal scan system constructed in accordance with the present invention.

FIG. 1 sets forth a partial block diagram of a multiple frequency horizontal scan system having frequency compensation. In accordance with conventional fabrication techniques, the scan system of FIG. 1 includes a sync separator 11 receiving a composite video and sync signal. A horizontal automatic frequency and phase control circuit 12 is coupled to sync separator 11 and responds to the synchronizing signals from sync separator 11 to control the frequency and phase of a conventional horizontal oscillator 13. The output of horizontal oscillator 13 is coupled to a horizontal output amplifier 30. Horizontal output amplifier 30 comprises a NPN transistor having an emitter 31 coupled to ground, a base 32 coupled to oscillator 13, and a collector 33. Collector 33 is coupled to a primary winding 18 of a horizontal output transformer 16. In further accordance with conventional fabrication techniques, a damper capacitor 17 is coupled between collector 33 and ground. A deflection yoke 15 is coupled to collector 33 of horizontal output transistor 30. A high voltage secondary winding 19 is magnetically coupled to primary 18 of output transformer 16 and is further coupled to a high voltage power supply 21 operative in accordance with conventional fabrication techniques to produce the required cathode ray tube electron beam accelerating potential (not shown). A regulated operating voltage supply 23 includes conventional voltage regulating circuitry and is operative to provide one or more B-plus operating voltages for the horizontal scan system.

The portions of FIG. 1 described thus far conform generally to conventional fabrication techniques for horizontal scan and high voltage generation systems for television receivers and computer monitors and the like. In accordance with the invention, the circuit of FIG. 1 further includes a horizontal frequency detector 22 coupled to sync separator 11. Frequency detector 22 is coupled to a frequency responsive switching system 40. A center tapped transformer secondary coil 20 is magnetically coupled to primary winding 18 of horizontal output transformer 16. Transformer 20 includes a center tap coupled to a source of operating supply and a pair of connections 24 and 25 coupled to a horizontal retrace adjusting circuit 42. A horizontal linearity switching circuit 43 is coupled to the lower end connection 14 of horizontal yoke 15. In accordance with the invention, frequency responsive switching circuit 40 produces an output switching signal set which is coupled to horizontal retrace adjusting circuit 42, horizontal linearity switching circuit 43, and to regulated operating supply voltage source 23. In addition, a plurality of auxiliary elements 44 described below are also coupled to frequency responsive switching circuit 40.

In operation, composite video and sync input signals are processed by sync separator 11 to recover the horizontal scan synchronizing signals therein. The scan synchronizing signals which take the form of negative going sync pulses at the desired horizontal scan rate are applied to horizontal automatic frequency and phase control 12 and to horizontal frequency detector 22. In accordance with conventional scan system operation, horizontal automatic frequency and phase control system 12 responds to the applied synchronization signals and conforms the frequency and phase of horizontal oscillator 13 generally thereto. The output signal of horizontal oscillator 13 is amplified by output transistor 30 to periodically switch primary winding 18 of transformer 16 between operating supply and ground thereby providing the scan system energy input for transistor 30. Concurrently, the switching of transistor 30 provides a horizontal rate current within yoke 15 which in turn produces the required horizontal scan rate magnetic deflection fields within the cathode ray tube display (not shown). In further accordance with conventional scan system operation, a portion of the energy within primary winding 18 of transformer 16 is coupled to secondary winding 19 providing a high amplitude voltage plus which is processed by high voltage circuit 21 to produce the above-mentioned CRT accelerating voltage.

In accordance with the invention, horizontal frequency detector 22 produces an output voltage indicative of the frequency of the applied horizontal synchronization signals which is coupled to frequency responsive switching system 40. By means set forth below in greater detail, switching system 40 responds to the frequency indicative signals provided by detector 22 to configure horizontal retrace adjustment 42, horizontal linearity switch 43, and regulated operating supply voltage source 23 in the appropriate configuration to conform to the frequency of the applied synchronization signals. In addition, as is also set forth below in greater detail, the switching signal output of switching network 40 is further applied to a plurality of additional elements shown as auxiliary elements 44.

While the detailed operation of the circuit of FIG. 1 is set forth below, by way of overview the responses of horizontal retrace adjustment 42, horizontal linearity switch 43 and regulated operating supply 23 may be summarized in the following manner. With respect to horizontal retrace adjustment 42, it should be noted that retrace adjustment 42 is coupled across winding 20 which in turn is magnetically coupled to the remainder of horizontal output transformer 16. Thus, the reactance of horizontal retrace adjustment 42 forms a portion of the overall tuning of horizontal output transistor 16. Of particular interest is the reflected effect of the reactance between terminals 24 and 25 of winding 20 which is reflected to the tuning of primary winding 18. In its preferred form and as is set forth below in greater detail, horizontal retrace adjustment 42 comprises a variable reactance capacitive element set which correspondingly produces a capacitive reactance reflected to primary winding 18 having a value control by switching circuit 40. Thus, frequency switching circuit 40 operating through horizontal retrace adjusting circuit 42 is able to alter the tuning reflected to primary winding 18 and thereby influence the all-important horizontal retrace pulse duration.

In a similar fashion, linearity switch 43 includes reactive components which are selectively coupled to horizontal yoke 15 in response to switching circuit 40 to adjust the scan linearity of horizontal yoke 15 in the manner appropriate to the particular horizontal scan frequency.

With respect to regulated operating supply voltage 23, the operation of frequency responsive switching circuit described below provides the appropriate operating supply reference for regulated supply 23 for each horizontal scan frequency of operation.

Finally, with respect to auxiliary elements 44, no specific operation is set forth below. However, suffice it to say that auxiliary elements 44 represent a variety of additional system elements within the operation of the host CRT display for which it may be desirable to make frequency correlated adjustment. For example, it may be desirable to utilize the frequency responsive switching of circuit 40 to adjust the CRT brightness and focus voltages to maintain proper CRT display. Similarly, it may be equally desirable to further utilize the frequency responsive signal from circuit 40 to adjust vertical gain controls within the host CRT display.

Figure 2:
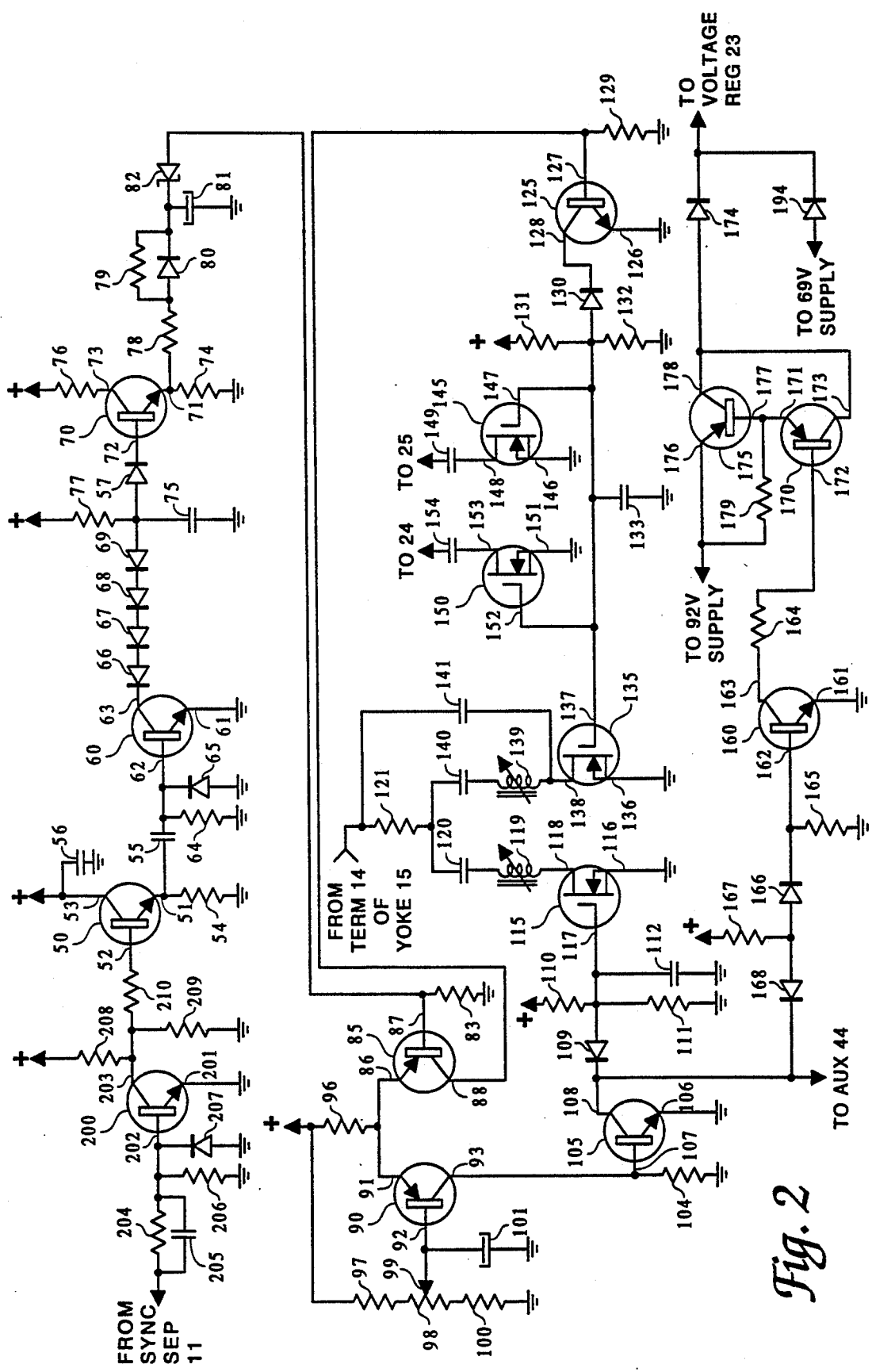
FIG. 2 sets forth a schematic diagram of the present invention multiple frequency horizontal scan compensation system.

FIG. 2 sets forth a schematic diagram of the frequency responsive and compensating portions of the present invention circuit of FIG. 1. An NPN transistor 200 includes an emitter 201 coupled to ground, a base 202 coupled to sync separator 11 (seen in FIG. 1) through the parallel combination of resistor 204 and capacitor 205 and a collector 203 coupled to a source of operating supply voltage through resistor 208. Base 202 is further coupled to ground by the parallel combination of resistor 206 in parallel with diode 207. Collector 203 is coupled to ground through resistor 209. Collector 203 is also coupled to base 52 of transistor 50 through resistor 210.

An NPN transistor 50 includes an emitter 51 coupled to ground by a resistor 54, a base 52 coupled to resistor 210 and a collector 53 coupled to a source of operating supply voltage. A capacitor 56 is coupled between collector 53 and ground. An NPN transistor 60 includes an emitter 61 coupled to ground, a base 62 coupled to emitter 51 by a capacitor 55 and further coupled to ground by a parallel resistor 64 and diode 65, and a collector 63 coupled to the series combination of a trio of diodes 66, 67, 68 and 69. An NPN transistor 70 includes an emitter 71 coupled to ground by a resistor 74, a base 72 coupled to the cathode of diode 57, and a collector 73 coupled to a source of operating supply by a resistor 76. Base 72 is further coupled through diode 57 to operating supply by a resistor 77 and to ground by a capacitor 75.

A PNP transistor 85 includes an emitter 86 coupled to operating supply by resistor 96, a base 87 coupled to ground by a resistor 83, and a collector 88. Base 87 is further coupled to the series combination of a zener diode 82 and a diode 80 which is in parallel with resistor 79. The cathodes of zener 82 and diode 80 are coupled to ground by a capacitor 81 while the anode of diode 80 is coupled to emitter 71 of transistor 70 through resistor 78. A PNP transistor 90 includes an emitter 91 coupled to resistor 96, a base 92 coupled to a movable contact 99 of a potentiometer 98 and a collector 93. Potentiometer 98 is coupled to operating supply by a resistor 97 and to ground by a resistor 100. A capacitor 101 couples base 92 to ground.

An NPN transistor 105 includes an emitter 106 coupled to ground, a base 107 coupled to ground by a resistor 104 and further coupled to collector 93 of transistor 90 and a collector 108 coupled to the cathode of diode 109. A field effect transistor 115 includes a source 116 coupled to ground, a gate 117 coupled to collector 108 by a diode 109, and a drain 118 coupled to terminal 14 of yoke 15 (seen in FIG. 1) by the series combination of a linearity coil 119, a capacitor 120 and a resistor 121. Gate 117 is further coupled to a voltage divider formed by a resistor 110 and a resistor 111 coupled between supply and ground. Gate 117 is also coupled to ground through capacitor 112.

An NPN transistor 125 includes an emitter 126 coupled to ground, a base 127 coupled to ground by a resistor 129 and further coupled to collector 88 of transistor 85 and a collector 128 coupled to the cathode of diode 130. A field effect transistor 135 includes a source 136 coupled to ground, a gate 137 coupled to collector 128 by a diode 130, and a drain 138 coupled to the junction of resistor 121 and capacitor 120 by the series combination of a linearity coil 139 and a capacitor 140. Drain 138 is further coupled to terminal 14 of yoke 15 (seen in FIG. 1) by a capacitor 141. Gate 137 is further coupled to a voltage divider formed by a resistor 131 coupled to supply and a resistor 132 coupled to ground. Gate 137 is also coupled to ground through capacitor 133.

A field effect transistor 145 includes a source 146 coupled to ground, a gate 147 coupled to gate 137, and a drain 148 coupled to terminal 25 of transformer 20 (seen in FIG. 1) by a capacitor 149. A field effect transistor 150 includes a source 151 coupled to ground, a gate 152 coupled to gate 147, and a drain 153 coupled to terminal 24 of transformer 20 (seen in FIG. 1) by a capacitor 154.

An NPN transistor 160 includes an emitter 161 coupled to ground, a base 162 coupled to ground by a resistor 165, and a collector 163. Base 162 is further coupled to the cathode of a diode 166 having its anode coupled to supply by a resistor 167. A diode 168 has its anode coupled to the junction of resistor 167 and diode 166 and its cathode coupled to collector 108 of transistor 105. A PNP transistor 170 includes an emitter 171, a base 172 coupled to collector 163 by a resistor 164, and a collector 173. A PNP transistor 175 includes an emitter 176 coupled to a source of operating supply voltage (not shown), a base 177 coupled to emitter 171 and further coupled to a source of operating supply by a resistor 179 and a collector 178 coupled to collector 173 of transistor 170.

A pair of diodes 174 and 194 have their respective anodes coupled to collector 178 and the lower operating supply source respectively and their cathodes commonly coupled to regulated supply 23 (seen in FIG. 1).

In operation and by way of overview, the input negative going synchronization pulses from sync separator 11 are processed by transistors 30, 50, 60 and diodes 66 through 69 to produce a horizontal rate saw voltage waveform across saw forming capacitor 75 which is coupled to a peak detector formed by diode 80 and capacitor 81 through an emitter follower stage comprising transistor 70. The peak detected voltage across capacitor 81 forms a DC voltage which varies in response to frequency variations of the applied sync pulses. Transistors 85 and 90 form a differential amplifier pair which compare this frequency indicative DC voltage to a reference voltage and turn on transistor 105 for lower scan frequencies and alternatively turn on transistor 125 for higher scan frequencies. Field effect transistors 115 and 13 respond to the switching of transistors 105 and 125 to alternatively couple either linearity coil 139 or linearity coil 119 in series with yoke 15 (seen in FIG. 1). In addition, field effect transistors 145 and 150 respond to the switching of transistor 125 to place capacitors 154 and 149 across transformer winding 20 (seen in FIG. 1). Finally, transistors 160, 170 and 175 together with diodes 174 and 194 respond to the switching of differential transistor pair 85 and 90 to apply the appropriate operating supply voltage to regulator 23 (seen in FIG. 1).

More specifically, the negative going horizontal sync pulses from sync separator 11 are inverted and amplified by transistor 30 and coupled by emitter follower transistor 50 to a differentiating network formed by capacitor 55 and resistor 64 to produce a positive going trigger pulse at base 62 of transistor 60 which corresponds to the sync pulse leading edge. Thus, transistor 60 switches the series combination of diodes 66 through 69 to ground during the leading edge of the applied horizontal sync pulses. The switching action of transistor 60 periodically discharges capacitor 75 at the completion of each horizontal sync pulse. Between sync pulses, resistor 77 provides a charging current for capacitor 75. Thus, a saw wave voltage is formed across capacitor 75 having a frequency corresponding to the applied synchronization pulses. The horizontal rate saw wave voltage is peak detected by diode 80 and capacitor 81 to form a DC voltage at the cathode of zener diode 82. Resistor 79 permits the system to switch more reliably by allowing capacitor 81 to discharge sufficiently when going from a lower frequency to a higher frequency.

At this point, it should be noted that the amplitude of saw wave voltage formed across capacitor 75 varies inversely with the frequency of the applied horizontal sync pulses. In other words, since capacitor 75 charges at a generally constant rate, the longer interval between lower frequency sync pulses permits capacitor 75 to charge to a higher voltage. Conversely, the shorter period characteristic of higher frequency sync pulses results in charging capacitor 75 to a lower amplitude voltage. Thus, the peak detected voltage at the cathode of zener diode 82 is increased for low frequency sync pulses and decreased for higher frequency sync pulses. Thus, this voltage comprises a frequency indicative DC voltage. Zener diode 82 provides a fixed offset to the peak detected voltage which is applied to base 87 of transistor 85. As mentioned above, transistors 85 and 90 form a differential amplifier pair in which transistor 90 is coupled to a reference voltage source while transistor 85 is coupled to frequency dependent voltage. Thus, in response to low frequency horizontal sync pulses, a resulting DC voltage at base 87 of transistor 85 turns transistor 85 off causing transistor 90 to be turned on. In response to the lower DC voltage resulting from higher frequency sync pulses, transistor 85 is turned on causing transistor 90 to be turned off. Thus, the output voltages at collectors 88 and 93 provide a frequency responsive switching signal pair.

Assuming initially the presence of lower frequency synchronizing signals, transistor 85 is turned off and transistor 90 is turned on. The conduction of transistor 90 causes transistor 105 to conduct which in turn lowers the bias voltage at gate 117 of field effect transistor 115. As a result, field effect transistor 115 is nonconductive and linearity coil 119 is isolated from its ground connection and effectively removed from active coupling with yoke 15. Conversely, in the presence of lower frequency sync pulse signals, the nonconducting state of transistor 85 turns off transistor 125. With transistor 125 nonconducting, a positive bias is applied to gate 137 turning field effect transistor 135 on. The conduction of field effect transistor 135 completes the ground circuit coupling for linearity coil 139 effectively placing linearity coil 139 in series with horizontal yoke 15. Thus, in response to low frequency horizontal sync pulses, linearity coil 139 is coupled to yoke 15 while coil 119 is removed from active coupling.

The positive bias at gate 137 due to the nonconduction of transistor 125 is further coupled to gates 147 and 152 of field effect transistors 145 and 150 causing both field effect transistors to conduct. The conduction of field effect transistors 145 and 150 completes the ground coupling for capacitors 149 and 154 respectively which in turn causes capacitors 149 and 154 to form active elements providing an effective capacity across transformer winding 20 (seen in FIG. 1). This active capacitive element is reflected by transformer 16 to provide a reactive component which alters the tuning of primary winding 18 and thereby effects the retrace interval for the horizontal scan system.

Returning to transistors 105 and 125 and recalling that in response to low frequency horizontal sync pulses, transistor 105 conducts and transistor 125 is turned off, the conduction of transistor 105 effectively couples the cathode of diode 109 to ground which in turn removes the bias voltage from transistor 160 causing transistor 160 to turn off. The nonconduction of transistor 160 in turn causes transistors 170 and 175 to also be turned off. The nonconduction of transistor 175 isolates regulated supply 23 from the higher potential operating supply at emitter 176 of transistor 175. The lower voltage operating supply is coupled to regulated supply 23 (seen in FIG. 1) through diode 194. Thus, in response to lower frequency synchronizing pulses, a lower voltage operating supply signal is applied to regulated supply 23. In response to the lower voltage input, regulated supply 23 provides a decreased operating supply voltage for horizontal output transistor 30 (seen in FIG. 1) which in turn results in a constant high voltage potential within the system.

Returning to the differential amplifier formed by transistors 85 and 90, it will be recalled that the relative conductions of transistors 85 and 90 are reversed in response to higher frequency synchronizing pulses. Specifically, in response to higher frequency synchronizing pulses, a lower voltage is coupled to base 87 of transistor 85 causing transistor 85 to conduct and causing transistor 90 to be nonconductive. In response to the conduction of transistor 85, transistor 125 is turned on which in turn turns off field effect transistor 135. The nonconduction of transistor 90 causes transistor 105 to be turned off which in turn causes field effect transistor 115 to conduct. With field effect transistor 135 turned off, linearity coil 139 is isolated from its ground connection while linearity coil 119 is coupled to ground by the conduction of field effect transistor 115. Thus, linearity coil 139 is removed from active coupling to yoke 15 while linearity coil 119 is effectively coupled in series with yoke 15. Thus, in response to higher frequency synchronizing pulses, linearity coil 139 is removed and replaced by linearity coil 119 producing the desired tuning change for yoke 15. Concurrently, the conduction of transistor 125 also turns off field effect transistors 145 and 150. With the nonconduction of field effect transistors 145 and 150, capacitors 149 and 154 are no longer reflected across primary winding 18 of horizontal output transformer 16 (seen in FIG. 1). Thus, in response to higher frequency synchronizing pulses, a reduced capacity is reflected across transformer winding primary 18 which in turn alters the horizontal retrace pulse interval. Thus, the horizontal retrace interval is adjusted in a compensatory manner in response to higher frequency synchronizing pulses.

Once again, returning to transistors 105 and 125, it should be recalled that in response to higher frequency synchronizing pulses, transistor 125 conducts while transistor 105 is turned off. The nonconduction of transistor 105 isolates diode 168 from base 162 of transistor 160 and thus transistor 160 is forward biased and conducts. The conduction of transistor 160 lowers the voltage at base 172 of transistor 170 causing it to conduct which in turn reduces the voltage at base 177 of transistor 175 causing it to also conduct. The conduction of transistor 175 couples the increased supply voltage at emitter 176 to regulated supply 23 via diode 174. Thus, in response to higher frequency synchronizing pulse signals, the reduced operating voltage is isolated from regulated supply 23 by the nonconduction of diode 194 which is back biased while the increased operating supply voltage is coupled to regulated supply 23 by the conduction of transistor 175. Diodes 174 and 194 provide back voltage protection as transistor 175 operates to couple the supply voltage to regulated supply 23.

It will be apparent to those skilled in the art that the collector voltages at transistors 105 and 125 provide convenient frequency responsive switching voltages which may be used by auxiliary elements 44 (seen in FIG. 1) to accommodate the desired switching of such auxiliary elements in response to frequency changes of the horizontal synchronizing pulses.

What has been shown is a multiple frequency horizontal scan compensation system which responds to changes of the horizontal synchronizing signal frequency to implement appropriate changes of horizontal output transformer tuning, horizontal scan linearity and operating supply voltage to control the resulting cathode ray tube high voltage. The system shown also provides a source of convenient switching signals for the operation of additional or auxiliary circuit elements in response to changes of horizontal scan frequency. The system shown is effective to accomplish its compensating actions with a minimum of additional components and avoids the use of expensive system redundancy.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in providing scan frequency change compensation within a horizontal scan system having a horizontal output transformer, a horizontal deflection yoke and a regulated horizontal scan system operating supply voltage source, a method of compensating for scan frequency changes comprising the steps of:
   providing first and second linearity inductances;
   establishing at least one scan frequency dividing point;
   detecting the scan frequency of the scan system;
   determining whether the detected scan frequency is above or below said dividing point;
   altering the reflected reactance within said output transformer in response to said determining step;
   connecting either said first linearity inductance in series with said yoke or said second linearity inductance, different in value from said first linearity inductance in series with said yoke in response to said determining step; and
   changing the output voltage of said operating supply voltage source in response to said determining step.

2. The method of claim 1 wherein said transformer includes a secondary winding and a capacitive element and wherein said step of altering includes switching said capacitive element to and from coupling with said secondary winding.

3. The method of claim 2 wherein said operating supply voltage source is responsive to a reference voltage input and wherein said step of changing includes the step of supplying alternative reference voltage inputs.

4. For use in providing scan frequency change compensation within a horizontal scan system having a horizontal output transformer, a horizontal deflection yoke and a regulated horizontal scan system operating supply voltage source, compensating means for scan frequency changes comprising:
   first and second linearity inductances;
   means for establishing at least one scan frequency dividing point;
   means for detecting the scan frequency of the scan system;
   means for determining whether the detected scan frequency is above or below said dividing point;
   means for altering the reflected reactance within said output transformer in response to said means for determining;
   means for connecting either said first linearity inductance in series with said yoke or said second linearity inductance, different in value from said first linearity inductance in series with said yoke in response to said means for determining; and
   means for changing the output voltage of said operating supply voltage source in response to said means for determining.

5. Compensating means as set forth in claim 4 wherein said transformer includes a secondary winding and a capacitive element and wherein said means for altering includes means for switching said capacitive element to and from coupling with said secondary winding.

6. Compensating means as set forth in claim 5 wherein said operating supply voltage source is responsive to a reference voltage input and wherein said means for changing includes means for supplying alternative reference voltage inputs.

7. For use in a horizontal scan system having a source of alternative frequency horizontal scan synchronizing signals, a horizontal output amplifier, a horizontal output transformer, a horizontal deflection yoke and a regulated operating voltage supply having a reference voltage input, frequency compensating means comprising:
   frequency detecting means for producing a control signal indicative of the frequency of said scan synchronizing signals;
   a transformer secondary winding upon said horizontal output transformer;
   a plurality of linearity inductances;
   first switching means responsive to said control signal to couple a selected capacitive reactance across said secondary winding;
   second switching means responsive to said control signal to couple a selected one of said inductances in series with said deflection yoke; and
   third switching means for applying a reference voltage input to said regulated operating voltage supply selected in response to said control signal.

* * * * *